Oct. 30, 1962  R. E. HYDE  3,061,247
AIRPLANE LIQUID-SPRAYING DEVICE
Filed May 19, 1960  3 Sheets-Sheet 1
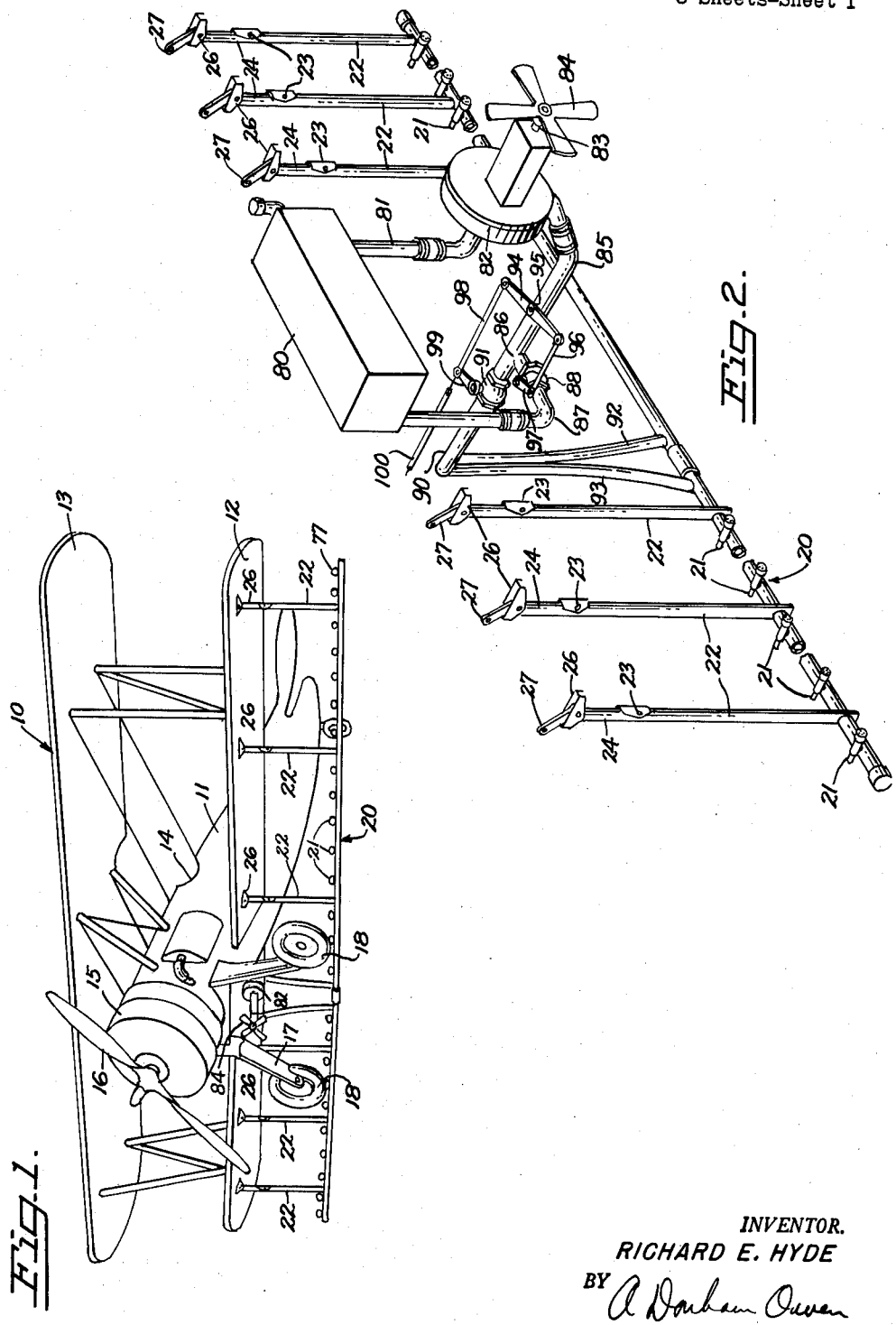
INVENTOR.
RICHARD E. HYDE
BY
ATTORNEY Oct. 30, 1962 R. E. HYDE 3,061,247
AIRPLANE LIQUID-SPRAYING DEVICE
Filed May 19, 1960 3 Sheets-Sheet 2

INVENTOR.
RICHARD E. HYDE
BY
ATTORNEY.

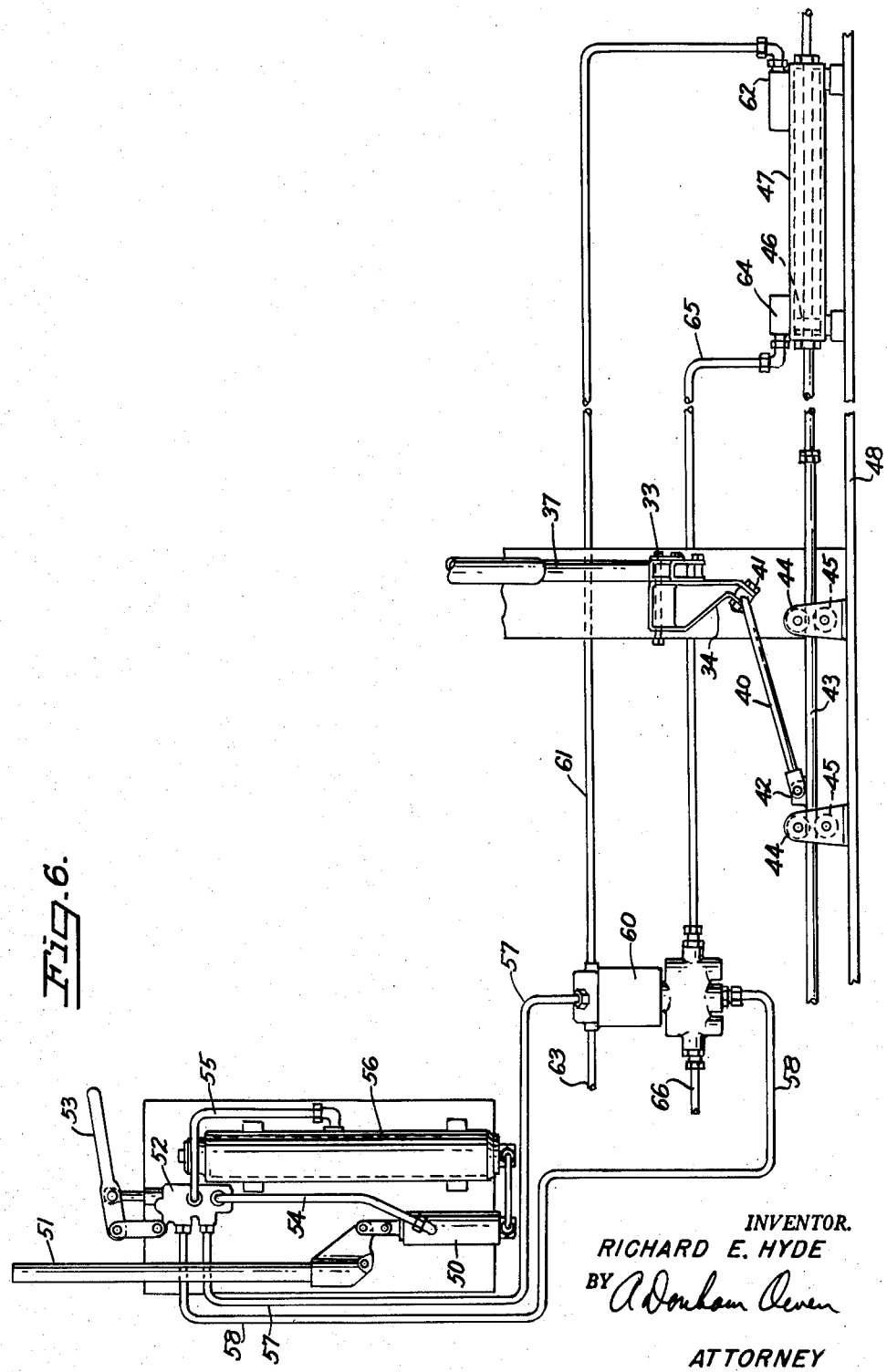

United States Patent Office 3,061,247
Patented Oct. 30, 1962

3,061,247
AIRPLANE LIQUID-SPRAYING DEVICE
Richard E. Hyde, 190 Greer Road, Woodside, Calif.
Filed May 19, 1960, Ser. No. 30,109
4 Claims. (Cl. 244—136)

This invention relates to an airplane liquid-spraying device.

When crops are sprayed with liquid insecticides, fungicides, etc., better and more uniform coverage is obtained and less liquid is wasted when the liquid falls on the leaves in an even pattern and in uniform droplet size, instead of being dispersed unevenly or in a fog or a very fine mist. The importance of the even pattern is that an exact amount of the material is required on each square foot of the area to be treated. The importance of the proper droplets size arises from the facts that (1) large drops tend to touch only part of the plant, and (2) the liquid particles in a very fine mist tend to evaporate and to be blown away as they fall, so that some of the liquid never reaches the leaves of the crop being sprayed and, if the case of convetional airplane sprayers, the distribution is uneven. It takes less liquid to do the same job and the job is done better when the spray particles are in proper, uniform, droplet size.

The effectiveness of conventional airplane spraying units has been impaired by the air-flow patterns of the air whirled by the propeller and the air passing around the wing, the wheels, the landing gear, and other parts of the plane. The propeller blast moves air from one side of the airplane to the other, the direction of flow depending on the direction of rotation of the propeller, while the air movement at the wing tip is in a vortex from the lower surface of the wing, where the air has greater density, around the wing tips to the upper surface of the wing, where the air has less density. Where the two varying air pressures meet, there is a circular air movement like a cyclone along a horizontal axis. The air movement past the wheels and landing gear is extremely turbulent and uneven, much resembling the varying eddies and currents created by protruding rocks in the water currents on a seashore. These air movements have tended to make the spray pattern from prior-art systems uneven and have tended to break up the spray particles, particularly in the propeller blast area, at the wing tips, and back of the wheels and landing gear, so that the spray has been dispersed unevenly and in the form of a very fine mist.

The present invention avoids subjecting the spray droplets to this air disturbance by issuing the spray droplets at a level below the disturbance. The spray material is not blown away by the propeller blast or by the air currents created thereby, nor is it affected by the vortex created by the outward movement of air along the wings or the diffused air currents that pass around the wheels and landing gear. This makes it possible to reduce the liquid dosage per acre, both because of the resultant evenness of application and because far less is blown away. Moreover, the present invention provides an assembly wherein the spray boom with its nozzles can be raised and lowered so that they can extend down low when spraying and at other times can be lifted so as not to interfere with the landing operation of the plane.

Other objects and advantages of the invention will appear from the following description of a preferred embodiment thereof.

In the drawings:

FIG. 1 is a perspective view of an airplane spraying unit embodying the principles of the invention. The spray boom is shown in its lowered, spraying position with the airplane flying.

FIG. 2 is a perspective view of the spraying apparatus removed from the airplane and including the spray boom, the spray nozzles, the spray container tank, and the pump system. Portions of the spray booms are broken in order to conserve space.

FIG. 6 is a view in front elevation of the boom control apparatus showing the cockpit controls and the boom on one side of the airplane, with portions broken in order to conserve space. Only one side of the airplane is shown, together with the equalizing valve; the apparatus on the other side is a symmetrical duplicate.

Figure 3:
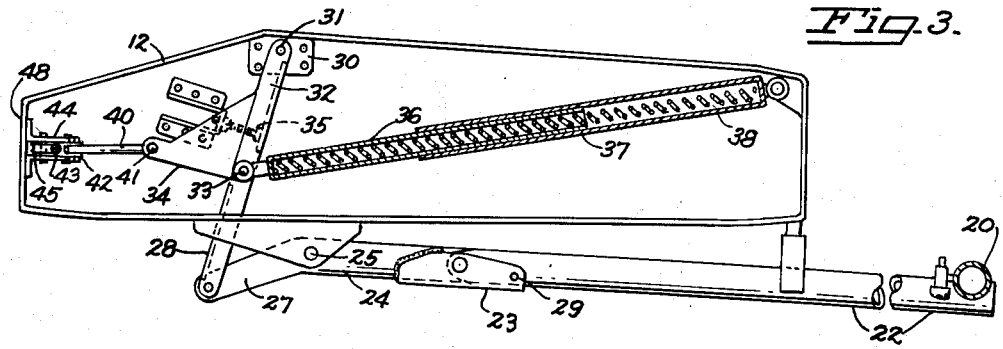
FIG. 3 is a view in side elevation and in section of an airplane wing having the spray boom of the invention and one of the boom supports. The boom is shown in its raised position where it is close to and generally parallel to the wing.

FIG. 1 shows an airplane 10 with a fuselage 11. The plane 10, illustrated for example only, is a biplane with a lower wing 12 and an upper wing 13. The fuselage 11 has a cockpit 14 for the pilot, and at its nose it has an engine 15 and a propeller 16. The airplane 10 also has a landing gear 17 with wheels 18 and, in conformance with conventional crop-spraying planes, the landing gear 17 is preferably not retractable.

An important problem solved by the present invention relates to the fact that the propeller draft creates strong air currents that tend to break up liquid droplets. Also, the outward movement of air along the wing 12 creates a kind of vortex, and the movement of air past the wheels and landing gear creates disturbed and uneven air currents. The resulting turbulence affects the air adjacent the wing 12, and the propeller 16, and the landing gear 17 for a substantial distance below and above the wing 12, so that when spray nozzles are located closely adjacent to the wing 12, the spray is ejected into the turbulent airstream, where it is broken up into a fine mist, and into an uneven pattern, thereby impairing its effectiveness.

Figure 4:
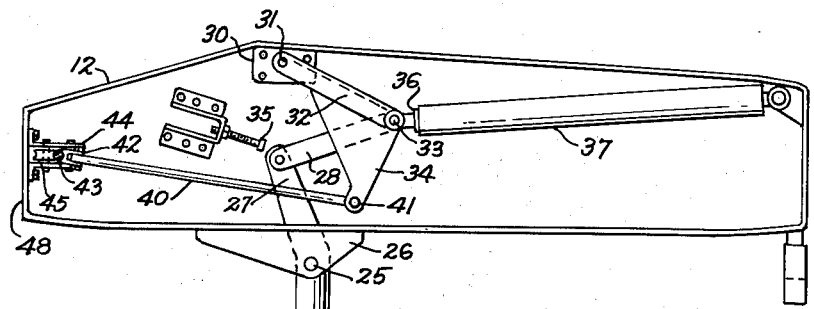
FIG. 4 is a view similar to FIG. 3 with the boom shown in its lowered position.

In the present invention, the spray unit (see FIG. 2 especially) includes a hollow boom or manifold 20 of substantial length having a series of nozzles 21. The boom 20 is supported so that it can be raised parallel to the wing 12 and close to it, as shown in FIGS. 1, 2, and 4. In a normal non-spraying position the nozzles 21 lie close to the plane wing 12, but in spraying position they are below the turbulent area adjacent the wing; preferably they then lie below the landing gear 17 and its wheels 18, as shown in FIG. 1.

The boom 20 may be supported from the lower surface of the wing 12 and below the fuselage by a series of straight rods 22, which are welded or otherwise secured to the boom 20. Each rod 22 may be joined (see FIGS. 3 and 4) by a fastening member 23 to a crank 24 which is pivoted on a fulcrum 25 supported by a stationary bracket 26 carried by and beneath the wing 12. The crank 24 has an inclined arm 27 on the opposite side of the fulcrum from the rod 22. To the arm 27 is pivoted a link 28. The fastening member 23 includes a shear pin 29 which breaks if the boom 20 or rods 22 strike an obstruction, as in forgetfully landing with the boom 20 down; with the shear pin 29 broken, the rods 22 and boom 20 swing up out of the way.

A bracket 30 just below the upper surface of the wing 12 supports a pivot 31 for a lever 32, which is joined to the link 28 by a pivot 33 and has a yoke 34 extending out from the pivot 33 perpendicularly to the arm 32. Thus the lever 32 and link 28 constitute a toggle controlled through the yoke 34. A stop member 35 is provided so that in the FIG. 3 position the toggle is substantially straight and will not break to the other side. To the pivot 33 is also attached a tube 36 of a telescoping-tubes shock absorbed 37, shown in FIG. 3, having a spring 38.

To the yoke 34 a rod 40 is secured (see FIG. 6) as by a pin 41. The rod 40 is pivoted to a bracket 42 on a reciprocating piston rod 43 which extends horizontally from side to side through the wing 12 and is supported by sets of rollers 44 and 45 so that the rod 43 will not sag. The rod 43 is attached to a piston 46 in a cylinder 47. The rollers 44, 45, and the cylinder 47 may be mounted on the forward edge 48 of the wing 12. Thus, when the piston 46 moves to the left in FIG. 6, it will move the rod 43 to the left and when the piston 46 moves to the right, the rod 43 will likewise move to the right. Movement of the rod 43 causes movement of the rod 40 and therefore of the yoke 34 and of the toggle arms 28 and 32, so that the arms 22 that support the boom 20 are swung up or down, as shown in FIGS. 3 and 4.

Any suitable type of pneumatic or hydraulic actuation may be used to actuate the piston 46. A hydraulic system is shown by way of example. This system incorporates a hand pump 50 with a handle 51 and a directional control valve 52 with an operating lever 53. Both the handle 51 and the lever 53 are preferably in the cockpit 14. A conduit 54 connects the pump 50 with the valve 52, while a conduit 55 connects the valve 52 with a fluid reservoir 56. The valve 52 connects the pump conduit 54 with one of two conduits 57 and 58 and connects the other conduit 57 or 58 with the return conduit 55. Thus, when the pilot is flying, he starts off with the spray boom 20 raised just below the wing 12. When he wishes to spray, or shortly before he wishes to, he moves the handle 53 to actuate the valve 52 so that the conduit 57 is connected to the pump conduit 54 and the conduit 58 is connected to the return conduit 55. He then pumps the handle 51 back and forth to send hydaulic fluid from the hydraulic pump 50 via the conduit 54, valve 52 and conduit 57 to an equalizing valve 60, whence it flows by a conduit 61 to a port 62 at one end of the cylinder 47, moving the piston 46 to the left, as shown in FIG. 6. At the same time a similar cylinder on the opposite side of the plane is actuated by fluid supplied through a conduit 63. At this time, fluid is returned to the reservoir 56 via a port 64, a conduit 65, the valve 60, the conduit 58, and the valve 52 and conduit 55. When he wishes to raise the spray boom 20, he moves the control handle 53 to connect the conduit 54 to the conduit 58 and then pumps the handle 51 to send fluid through the conduit 54, valve 52, conduit 58, equalizing valve 60, conduit 65, and port 64 to the cylinder 47 to move the piston 46 to the right. A conduit 66 from the equalizing valve 60 leads to the cylinder on the other wing tip.

Figure 5:
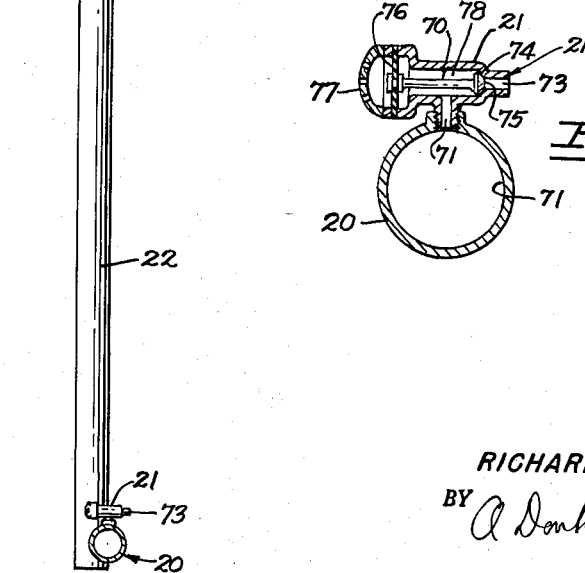
FIG. 5 is an enlarged view in elevation and in section of the boom and one of its spraying nozzles.

Each nozzle 21 preferably includes a drip-proof valve 70 (see FIG. 5). Each nozzle 21 has an inlet 71 connected to the interior passage 72 of the manifold boom 20. Adjacent a nozzle outlet 73 is a valve seat 74 against which a movable valve member 75 is normally closed. The valve closure member 75 is connected to a diaphragm 76. A perforate cover member 77 protects the atmospheric side of the diaphragm 76 and while affording access of air to maintain atmospheric pressure on one side of the diaphragm 76. Atmospheric pressure always tends to move the diaphraga 76 to a position where the valve member 75 rests against its seat 74 and therefore closes the valve 70. However, when fluid under pressure (that is, when the liquid to be sprayed is being pumped) enters the inlet 71, it flows into a chamber 78. Its pressure builds up, counteracts the atmospheric pressure on the diaphragm 76, and therefore opens the valve 70 by moving the closure member 75 away from the seat 74. This arrangement assures that liquid will not drip through the nozzles 21 when no spraying is being done.

The vast bulk of the spray solution is preferably retained in a tank 80 (see FIG. 2) having an outlet tube 81 that leads to a pump 82 whose pump element is connected by a shaft 83 to a fan 84. The fan 84 is driven by air when the airplane 10 is in flight, and its rotation operates the pump 82. In other words, the pump 82 is driven by the movement of the plane 10 through the air so that no separate motor is needed and there is no extra load on the airplane engine 15. From the pump 82 an outlet tube 85 leads to a T 86 whence one conduit 87 leads through a valve 88 back to the tank 80. Another conduit 90 leads to a valve 91 and from there through tubes 92 and 93 to the manifold boom 20.

A lever 94 is preferably mounted by a center pivot 95 on the tube 85. One end of the lever 94 is connected by a link 96 to a crank 97 which opens and closes the valve 88. The other end of the lever 94 is connected by a link 98 to a crank arm 99 which opens and shuts the valve 91. Thus, the levers and links are arranged to open the valve 91 when the valve 88 is closed, and vice versa. Moreover, the link 98 is connected by an arm 100 to a control member (not shown) in or adjacent the cockpit 14. When the valve 88 is open, the valve 91 is closed, so that the pump 82 merely circulates the spray liquid from the bottom of the tank 80 around and back into the tank 80 via the conduits 81, 85, and 87. This enables the pump 82 to operate all the time that the fan 84 is moving. It also helps to keep the spray solution mixed and, by maintaining circulation, makes it possible to eliminate parts. When the boom 20 has been lowered to its spraying position, the lever system may be operated by the arm 100 to close the valve 88 and open the valve 91 so that the pump 82 then pumps liquid from the tank 80 into the boom 20. As pressure builds up inside the boom passage 72, the liquid forces open the valve 70 and the liquid then passes through the nozzles 21 and is dispensed from their outlets 73.

In operation, therefore, the airplane spraying apparatus is normally disposed with the valve 88 open, the valve 91 closed, and the boom 20 in its upper position. When the plane 10 takes off, everything remains in this position, but as the plane 10 gathers speed, air drives the fan 84 and therefore operates the pump 82 which, at this time, merely mixes the liquid and returns it to the tank 80. The pilot prepares to spray by moving the directional control lever 53 to its "down" position and then pumping the handle 51 until the boom 20 is in its lower position. When the boom 20 is in its lower position, the nozzles 21 are in their spraying position, and the arm 100 is then used at the beginning of each run to open the valve 91 and close the valve 88 and so send liquid under pressure into the boom 20. The pressure of the liquid in the boom passage opens the valve 70 and sends liquid through the nozzle outlets 73. There is no need to provide any special venturi action or anything at the outlets 73, because the sweep of the wind at the end of the nozzles seems to draw the liquid out in the desired form. At the end of each run, the lever system is operated by the arm 100 to close the valve 91 and open the valve 88. At the end of the spraying operation, the boom 20 is moved to its upper position by moving the control handle 53 to its upper position and then pumping the handle 51. The hydraulic pressure holds the boom 20 in its upper position. This is always done prior to landing the airplane.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. An airplane spraying unit including in combination a propeller-driven airplane having a fixed wing, a fuselage, and landing gear; a hollow spray boom of substantial length supported below said fuselage aft of said propeller and below and parallel to said wing, said boom extending out on both sides of said fuselage and having a plurality of spray nozzles on each side of said fuselage; means for pumping spray solution into said boom under pressure; and pivotally mounted swinging means for raising and lowering said boom between a non-spraying position closely adjacent to said wing and a spraying position well below said landing gear, out of the draft of said propeller and out of the turbulence set up by movement of said landing gear through the air, and for holding said boom in either said position.

2. An airplane spraying unit including in combination a propeller-driven airplane, having a fixed hollow wing, a fuselage, and landing gear; a hollow spray boom extending a substantial distance widthwise of said airplane having a plurality of nozzles; a plurality of support rods pivotally supported relative to said wing and supporting said boom below said fuselage and below and parallel to said wing; means for pumping spray solution into said boom under pressure; and means on said wing for supporting said support rods pivotally; means for swinging said support rods around an arc of about 90° for raising and lowering said boom between a non-spraying position closely adjacent to said wing and a spraying position well below said landing gear and said wing and out of the draft of said propeller and the turbulence set up by movement of said landing gear through the air, and for holding said boom in either said position.

3. An airplane spraying apparatus including in combination an airplane having a fixed hollow wing and a fuselage with a cockpit; a hollow boom having a series of nozzles thereon located below said fuselage and below and parallel to said wing; a storage tank for spraying solution; means for pumping spray solution into said boom under pressure from said storage tank; and means for raising and lowering said boom between an upper non-spraying position closely adjacent the wing and a lower spraying position well below said wing while holding said boom horizontally parallel to said wing in both positions, said means comprising a pivotally mounted series of rods supporting said boom to swing said boom up and down approximately 90° from a position where said rods are substantially horizontal to a position where said rods are substantially vertical relative to said wing, a hydraulic system having a hand-operated pump with a control means closely adjacent said cockpit, a directional control valve connected to said pump and also with a control means closely adjacent said cockpit, a pair of conduits connected to said valve, cylinders having ports at each end connected to said conduits and pistons with rods extending out therefrom, inside said wing, and toggle means inside said wing connecting said piston-rods to said first-named rods, so that said pump and valve control the position of said boom.

4. The apparatus of claim 3 wherein said rods supporting said boom are each provided with a connection having a pivot pin and a shear pin, normally holding the connection rigid, whereby application upon said rods or boom of force sufficient to break said shear pins results in pivoting said boom upwardly away from said force.

References Cited in the file of this patent

UNITED STATES PATENTS

| | | |
|---|---|---|
| 1,187,981 | Doucette | June 20, 1916 |
| 2,043,262 | Oglesby et al. | June 9, 1936 |
| 2,384,436 | Bossen | Sept. 11, 1945 |
| 2,772,061 | Sellers | Nov. 27, 1956 |

FOREIGN PATENTS

| | | |
|---|---|---|
| 134,585 | Australia | Oct. 10, 1949 |

OTHER REFERENCES

Aviation Week, vol. 56 Issue–1, Pub. Date Jan. 7, 1952, p. 15.